United States Patent
Kammerlander et al.

(10) Patent No.: US 10,826,312 B2
(45) Date of Patent: Nov. 3, 2020

(54) CHARGER CONTROL CIRCUIT AND METHOD FOR CHARGER CONTROL

(71) Applicant: ams AG, Unterpremstaetten (AT)

(72) Inventors: Peter Kammerlander, Graz (AT); Gerhard Loipold, Graz (AT)

(73) Assignee: ams AG, Unterpremstaetten (AT)

( * ) Notice: Subject to any disclaimer, the term of this patent is extended or adjusted under 35 U.S.C. 154(b) by 499 days.

(21) Appl. No.: 15/717,836

(22) Filed: Sep. 27, 2017

(65) Prior Publication Data
US 2018/0019609 A1 Jan. 18, 2018

Related U.S. Application Data

(63) Continuation-in-part of application No. PCT/EP2016/055834, filed on Mar. 17, 2016.

(30) Foreign Application Priority Data

Apr. 17, 2015 (EP) .................................... 15164078

(51) Int. Cl.
| | | |
|---|---|---|
| *H02J 7/00* | (2006.01) | |
| *H02J 1/10* | (2006.01) | |
| *G06F 1/26* | (2006.01) | |
| *H02J 7/34* | (2006.01) | |

(52) U.S. Cl.
CPC ............ *H02J 7/0068* (2013.01); *G06F 1/263* (2013.01); *H02J 1/10* (2013.01); *H02J 7/008* (2013.01); *H02J 7/34* (2013.01); *H02J 2207/40* (2020.01)

(58) Field of Classification Search
CPC ........ H02J 7/00; H02J 7/0068; H02J 2207/40; H02J 1/10; G06F 1/263

USPC ........................................................... 307/20
See application file for complete search history.

(56) References Cited

U.S. PATENT DOCUMENTS

| | | | | |
|---|---|---|---|---|
| 6,137,280 A | * | 10/2000 | Ackermann | .............. H02J 7/00 323/354 |
| 8,004,247 B1 | * | 8/2011 | Zhang | .................. H02J 2207/40 320/138 |
| 2004/0008007 A1 | * | 1/2004 | Nagai | .................. H02J 7/00714 320/134 |
| 2005/0040785 A1 | | 2/2005 | Barnes et al. | |

(Continued)

FOREIGN PATENT DOCUMENTS

EP 1737099 A1 12/2006

*Primary Examiner* — Rexford N Barnie
*Assistant Examiner* — Swarna N Chowdhuri
(74) *Attorney, Agent, or Firm* — Fish & Richardson P.C.

(57) ABSTRACT

A charger control circuit (CC) comprises a first charger terminal (CT1) and a system terminal (ST) and is configured to assign a voltage applied at the first charger terminal (CT1) to one of at least three voltage ranges by performing at least one voltage comparison. The charger control circuit (CC) is configured to determine and distinguish, based on the assignment, whether an external charger (EXC1) or a secondary battery (SBAT) is connected to the first charger terminal (CT1). Furthermore, the charger control circuit (CC) is configured to, depending on a predetermined operating state of the first charger terminal (CT1), supply power from the secondary battery (SBAT) or the external charger (EXC1) to a portable electronic device via the system terminal (ST) when the secondary battery (SBAT) or the external charger, respectively, is connected to the first charger terminal (CT1).

20 Claims, 4 Drawing Sheets (56) References Cited

U.S. PATENT DOCUMENTS

2009/0174366 A1\* 7/2009 Ahmad ............... H02J 2207/40
320/114
2011/0156659 A1 6/2011 Saeki et al.
2011/0307732 A1 12/2011 Furusho et al.
2012/0212078 A1 8/2012 Lanni \* cited by examiner

CHARGER CONTROL CIRCUIT AND METHOD FOR CHARGER CONTROL

CROSS-REFERENCE TO RELATED APPLICATIONS

The present application is a continuation-in-part of International Patent Application No. PCT/EP2016/055834, filed on Mar. 17, 2016, which claims the benefit of priority to European Patent Application No. 15164078.6, filed on Apr. 17, 2015, all of which are hereby incorporated by reference in their entirety for all purposes.

BACKGROUND OF THE INVENTION

The invention relates to a charger control circuit, in particular for controlling charging and power supply of a portable electronic device and to a corresponding method for charger control.

To extend battery life time, some portable electronic devices, such as cameras, mobile phones, portable computers or the like, offer a possibility to attach a secondary battery for example for providing additional power to the system. For example due to a limitation of available connectors, a universal serial bus input or charger input may commonly be used to connect the secondary battery. For the sake of compliance with currently available charger inputs, a battery output voltage, which may originally lie at about 2.5V to 4.4V, for example at ~3.7V, may have to be boosted to a higher voltage, for example to a voltage of about ~5V, corresponding for example to a minimum output voltage of an external charger or a charger detection voltage. This may require additional components and therefore increase costs and further may lower an efficiency of the power delivery.

Charging of the secondary battery may have to be performed with a dedicated battery charger, which may be an additional external device. For providing the boost function, the dedicated battery charger for example needs to be either a switched mode charger with an on-the-go function, or a separate booster may be needed.

Furthermore, existing charger control solutions may reconnect the main battery to the system supply when the system supply voltage falls below the main battery voltage, preventing from discharging the secondary battery to below the main battery voltage.

SUMMARY OF THE INVENTION

According to the improved concept, it is determined by detecting a presence and a value of a voltage applied at a first charger terminal, whether a secondary battery or an external charger is connected to the terminal. The first charger terminal is comprised by a charger control circuit of an electronic device. Then, power may be supplied accordingly either from the secondary battery or the external charger.

According to an embodiment of the improved concept, a charger control circuit for a portable electronic device comprises a first charger terminal and a system terminal. The charger control circuit is configured to assign a voltage applied at the first charger terminal to one of at least three voltage ranges by performing at least one voltage comparison. The charger control circuit is further configured to determine and distinguish, based on the assignment, whether an external charger or a secondary battery is connected to the first charger terminal. In particular, the charger control circuit is configured to determine, based on the assignment, whether the external charger or the secondary battery or neither of both is connected to the first charger terminal and, in case the external charger or the secondary battery is connected to the first charger terminal, distinguish, based on the assignment, which of the external charger and the secondary battery is connected to the first charger terminal.

Furthermore, the charger control circuit is configured to, depending on a predetermined operating state of the first charger terminal, supply power from the secondary battery to the portable electronic device via the system terminal when the secondary battery is connected to the first charger terminal, and supply power from the external charger to the portable electronic device via the system terminal when the external charger is connected to the first charger terminal.

In some implementations, the three voltage ranges correspond for example to a first voltage range for voltage values below a first threshold value, to a second voltage range for voltage values above the first threshold value and below a second threshold value, and to a third voltage range for voltage values above the second threshold value. Therein, the second threshold value is greater than the first threshold value.

The first threshold value may for example correspond to a minimum battery detection voltage, while the second threshold value may for example correspond to a minimum charger detection voltage.

In some implementations, the charger control circuit determines that neither the external charger nor the secondary battery is connected to the first charger terminal if the voltage applied at the first charger terminal lies within the first voltage range, for example if no voltage is applied to the first charger terminal at all. The charger control circuit determines that the secondary battery is connected to the first charger terminal if the voltage applied at the first charger terminal lies within the second voltage range and that the external charger is connected to the first charger terminal if the voltage applied at the first charger terminal lies within the third voltage range.

Such implementations may be of particular advantage if the voltage applied at the first charger terminal, for example by construction of the secondary battery and/or the external charger, cannot be greater than the second threshold value in case the secondary battery is connected to the first charger terminal and cannot be smaller than the second threshold value in case the external charger is connected to the first charger terminal. In such a case, the assignment of the voltage applied at the first charger terminal to one of the three voltage ranges allows to uniquely distinguish between the secondary battery and the external charger being connected to the first charger terminal.

In some implementations, the charger control circuit is further configured to identify a pin assignment of a connector connected to the first charger terminal. Alternatively or in addition to the above described implementations, the charger control circuit is configured to determine and distinguish, based on the assignment of the voltage applied at the first charger terminal to one of the at least three voltage ranges and/or based on the identified pin assignment, whether the external charger or the secondary battery is connected to the first charger terminal.

Such implementations may for example be of particular advantage, if the voltage applied at the first charger terminal can be greater than the second threshold value in case the secondary battery is connected to the first charger input.

In some implementations, the portable electronic device is a photo camera, a video camera, a mobile phone, a tablet computer, a notebook computer, a portable media player or a portable loudspeaker.

In some implementations, the charger control circuit is implemented as an integrated circuit, IC, in particular as a single IC or as two, three or more ICs.

In some implementations, the charger control circuit comprises a first circuit block, for example a charger block, and a second circuit block, for example a power-path-and-current-limiter block. The first charger terminal and the system terminal are for example comprised by or connected to the first circuit block. Alternatively, the first charger terminal and/or the system terminal are comprised by or connected to the second circuit block.

In some implementations, the predetermined operating state of the first charger terminal corresponds to an enabling or disabling of the first charger terminal. The operating state of the first charger terminal may for example be controlled by a firmware or a software of the portable electronic device. Alternatively or in addition, the operating state of the first charger terminal may be controlled by the charger control circuit.

In some implementations, power is supplied from the secondary battery or from the external charger to the portable electronic device if the operating state of the first charger terminal corresponds to an enabling of the first charger terminal; and no power is supplied from the secondary battery or from the external charger to the portable electronic device, if the operating state of the first charger terminal corresponds to a disabling of the first charger terminal.

In some implementations, the charger control circuit is configured to supply power from the secondary battery to the portable electronic device when the secondary battery is connected to the first charger terminal and the operating state of the charger terminal corresponds to an enabling of the first charger terminal and/or of the secondary battery. Analogously, the charger control circuit is configured to supply power from the external charger to the portable electronic device when the external charger is connected to the first charger terminal and the operating state of the first charger terminal corresponds to an enabling of the first charger terminal and/or of the external charger. If the operating state of the first charger terminal corresponds to a disabling of the first charger terminal, no power is supplied from the secondary battery or from the external charger, respectively, to the portable electronic device.

The secondary battery may for example be integrated, in an exchangeable or a non-exchangeable manner, into the portable electronic device. Alternatively, the secondary battery may be external to the portable electronic device.

In further implementations, the charger control circuit further comprises a main battery terminal adapted to connect a main battery. In such implementations, the supply of power from the secondary battery to the portable electronic device may be carried out when an output voltage of the secondary battery is larger than an output voltage of the main battery and when the output voltage of the secondary battery is smaller than the output voltage of the main battery.

In further implementations, the charger control circuit further comprises a first current control element connected between the first charger terminal and the system terminal. The charger control circuit is configured to control, by the first current control element, a current from and/or to the charger control circuit via the first charger terminal.

In some implementations, the first current control element comprises a transistor, for example a bipolar transistor, a field effect transistor, a metal oxide semiconductor, MOS, field effect transistor, a power transistor or a power field effect transistor.

A source terminal of the first current control element is connected to the system terminal and a drain terminal of the first current control element is connected to the first charger terminal or vice versa. A gate terminal of the first control element is controlled by the charger control circuit.

In further implementations, the control of the current from and/or to the charger control circuit via the first charger terminal is based on a comparison of a value of the current from and/or to the charger control circuit via the first charger terminal to a specified first minimum current value and to a specified first maximum current value and/or to a specified first current range.

In some implementations, the charger control circuit further comprises a second charger terminal and is further configured to determine whether a further external charger is connected to the second charger terminal by performing a further voltage comparison. When the further external charger is connected to the second charger terminal, the charger control circuit is configured to supply power from the further external charger to the portable electronic device via the system terminal if a predetermined priority of the second charger terminal is higher than a predetermined priority of the first charger terminal. The charger control circuit is further configured to supply power from the secondary battery or from the external charger to the portable electronic device via the system terminal if the priority of the first charger terminal is higher than the priority of the second charger terminal.

In particular, this corresponds to a case in which the further external charger is connected to the second charger terminal and either the external charger or the secondary battery is connected to the first charger terminal. When the further external charger is connected to the second charger terminal and neither the external charger nor the secondary battery is connected to the first charger terminal or the operating state of the first charger terminal corresponds to a disabling of the first charger terminal, the charger control circuit may be configured to supply power from the further external charger to the portable electronic device via the system terminal also in case that the priority of the first charger terminal is higher than the priority of the second charger terminal.

Furthermore, the supply of power from the further external charger to the portable electronic device may depend on a predetermined operating state of the second charger terminal. In particular, the charger control circuit may be configured to supply power from the further external charger to the portable electronic device only if the operating state of the second charger terminal corresponds to an enabling of the second charger terminal and not to supply power from the further external charger to the portable electronic device if the operating state of the second charger terminal corresponds to a disabling of the second charger terminal.

The priorities of the first and the second charger terminal and/or the operating state of the second charger terminal may for example be predetermined by a software or a firmware of the portable electronic device or by the charger control circuit.

In some implementations, the charger control circuit is configured to determine whether the further external charger is connected to the second charger terminal by comparing a voltage applied to the second charger terminal to a further threshold value. The charger control circuit may for example determine that the further external charger is connected to the second charger terminal if a value of the voltage applied to the second charger terminal is greater than the further threshold value and determine that the further external charger is not connected to the second charger terminal if the value of the voltage applied to the second charger terminal is smaller than the further threshold value.

In some implementations, the second charger terminal is connected to or comprised by the first circuit block or the second circuit block.

In some implementations, the first and/or the second charger terminal are implemented as terminals for universal serial bus, USB, connectors, for stereo jack connectors, for phone connectors or other connectors.

In some implementations, the charger control circuit is further configured to supply a secondary charging current to the first charger terminal for charging the secondary battery from the further external charger, when the further external charger is connected to the second charger terminal, in particular when supplying power from the further external charger to the portable electronic device. In some implementations, the supply of the secondary charging current may depend on a charging being enabled by the software or firmware of the portable electronic device and/or by the charger control circuit.

In further implementations, the charger control circuit further comprises a main battery terminal adapted to connect a main battery and is further configured to supply a main charging current to the main battery terminal, in particular to the main battery, from the external charger, when the external charger is connected to the first charger terminal, in particular when supplying power from the external charger to the portable electronic device.

The main battery may for example be integrated into the portable electronic device. In particular, the main battery may be integrated into the portable electronic device in an exchangeable or a non-exchangeable manner.

In further implementations, the charger control circuit further comprises a main battery terminal adapted to connect a main battery and is configured to supply a main charging current to the a main battery terminal, in particular to the main battery, from at least one of the external charger and the further external charger, when the further external charger is connected to the second charger terminal, in particular when supplying power from the further external charger to the portable electronic device.

According to some implementations, the charger control circuit is further configured to supply the main charging current to the main battery terminal from the secondary battery, when the secondary battery is connected to the first charger terminal, in particular when supplying power from the secondary battery to the portable electronic device.

In further implementations, the charger control circuit further comprises a second current control element connected between the main battery terminal and the system terminal. The charger control circuit is further configured to control a current from and/or to the charger control circuit via the main battery terminal, in particular by the second current control element.

In some implementations, the supply of the main charging current may depend on the charging being enabled by the software or firmware of the portable electronic device and/or by the charger control circuit.

In some implementations, the second current control element comprises a transistor, a field effect transistor, a MOS field effect transistor, a power transistor or a power field effect transistor.

A source terminal of the second current control element is connected to the system terminal and a drain terminal of the second current control element is connected to the main battery terminal or vice versa. A gate terminal of the second control element is controlled by the charger control circuit.

In further implementations, the control of the current from and/or to the charger control circuit via the main battery terminal is based on a comparison of a value of the current from and/or to the charger control circuit via the main battery terminal to a specified second minimum current value and to a specified second maximum current value and/or to a specified second current range.

In further implementations, the charger control circuit further comprises a third current control element connected between the second charger terminal and the system terminal. The charger control circuit is further configured to control a current from and/or to the charger control circuit via the second charger terminal, in particular by the third current control element.

In some implementations, the third current control element comprises a transistor, a field effect transistor, a MOS, field effect transistor, a power transistor or a power field effect transistor.

A source terminal of the third current control element is connected to the system terminal and a drain terminal of the third current control element is connected to the second charger terminal or vice versa. A gate terminal of the third control element is controlled by the charger control circuit.

In further implementations, the control of the current from and/or to the charger control circuit via the second charger terminal is based on a comparison of a value of the current from and/or to the charger control circuit via the second charger terminal to a specified third minimum current value and to a specified third maximum current value and/or to a specified third current range.

In further implementations of the charger control circuit, the second current control element comprises a field effect transistor, in particular a MOS field effect transistor, in particular a power MOS field effect transistor, and a bulk switch circuitry. The bulk switch circuitry is configured to connect and disconnect a substrate terminal of the second current control element to and from, respectively, a source terminal of the second current control element and/or a drain terminal of the second current control element, depending on a ratio of a voltage applied to the main battery terminal, for example the output voltage of the main battery, and the voltage applied to the first charger terminal, for example the output voltage of the secondary battery or the external charger. Depending on a ratio may have the meaning of depending on a comparison of the voltage applied to the main battery terminal and the voltage applied to the first charger terminal.

In such implementations, power may be supplied from the secondary battery or the external charger to the portable electronic device if an absolute value of the voltage applied to the main battery terminal is larger than an absolute value of the voltage applied to the first charger terminal. However, power may also be supplied from the secondary battery or the external charger to the portable electronic device if the absolute value of the voltage applied to the main battery terminal is smaller than the absolute value of the voltage applied to the first charger terminal.

In some implementations, the field effect transistor comprised by the second current control element is implemented as a p-channel MOS transistor. In such implementations, if the output voltage of the main battery is larger than the output voltage of the secondary battery, the bulk switch circuitry is configured to connect the substrate terminal to the one of the source terminal and the drain terminal of the second current control element being connected to the main battery terminal. If the output voltage of the main battery is smaller than the output voltage of the secondary battery, the bulk switch circuitry is configured to connect the substrate terminal to the one of the source terminal and the drain terminal of the second current control element being connected to the system terminal.

In other implementations, the field effect transistor comprised by the second current control element is implemented as an n-channel MOS transistor. In such implementations, if the output voltage of the main battery is smaller than the output voltage of the secondary battery, the bulk switch circuitry is configured to connect the substrate terminal to the one of the source terminal and the drain terminal of the second current control element being connected to the main battery terminal. If the output voltage of the main battery is larger than the output voltage of the secondary battery, the bulk switch circuitry is configured to connect the substrate terminal to the one of the source terminal and the drain terminal of the second current control element being connected to the system terminal.

According to the improved procedure, also a method for charger control in a portable electronic device is provided. The method comprises assigning a voltage applied at a first charger terminal of a charger control circuit to one of at least three voltage ranges by performing at least one voltage comparison. The method further comprises determining and distinguishing, based on the assignment, whether an external charger or a secondary battery is connected to the first charger terminal. The method comprises, depending on a predetermined operating state of the first charger terminal, supplying power from the secondary battery to the portable electronic device via a system terminal of the charger control circuit when the secondary battery is connected to the first charger terminal and supplying power from the external charger to the portable electronic device via the system terminal when the external charger is connected to the first charger terminal.

Some implementations of the method further comprise controlling, by a first current control element of the charger control circuit connected between the first charger terminal and the system terminal, a current from and/or to the charger control circuit via the first charger terminal.

In further implementations of the method, the controlling is performed based on a comparison of a value of the current from and/or to the charger control circuit via the first charger terminal to a specified first minimum current value and to a specified first maximum current value. Alternatively or in addition, the controlling is performed based on a comparison of a value of the current from and/or to the charger control circuit via the first charger terminal to a specified first current range.

Further implementations of the method comprise determining whether a further external charger is connected to a second charger terminal of the charger control circuit by performing a further voltage comparison. When the further external charger is connected to the second charger terminal, the method further comprises supplying power from the further external charger to the portable electronic device via the system terminal if a predetermined priority of the second charger terminal is higher than a predetermined priority of the first charger terminal and supplying power from the secondary battery or from the external charger to the portable electronic device via the system terminal if the priority of the first charger terminal is higher than the priority of the second charger terminal.

According to further implementations, the method further comprises charging the secondary battery from the further external charger, when supplying power from the further external charger to electronic device.

According to further implementations, the charger control circuit further comprises a main battery terminal adapted to connect a main battery. The method further comprises supplying a main charging current to the main battery terminal from at least one of the external charger and the further external charger when supplying power from the further external charger to the portable electronic device.

Further implementations of the method are readily derived from the various implementations and embodiments of the charger control circuit. In particular, each of the described implementations of the charger control circuit directly results in a corresponding implementation of the method according to the improved concept.

BRIEF DESCRIPTION OF THE DRAWINGS

In the following, the invention is explained in detail with the aid of exemplary implementations by reference to the drawings. Components that are functionally identical or have an identical effect may be denoted by identical references. Identical components and/or components with identical effects may be described only with respect to the figure where they occur first; their description is not necessarily repeated in subsequent figures.

In the drawings.

DETAILED DESCRIPTION

Figure 1:
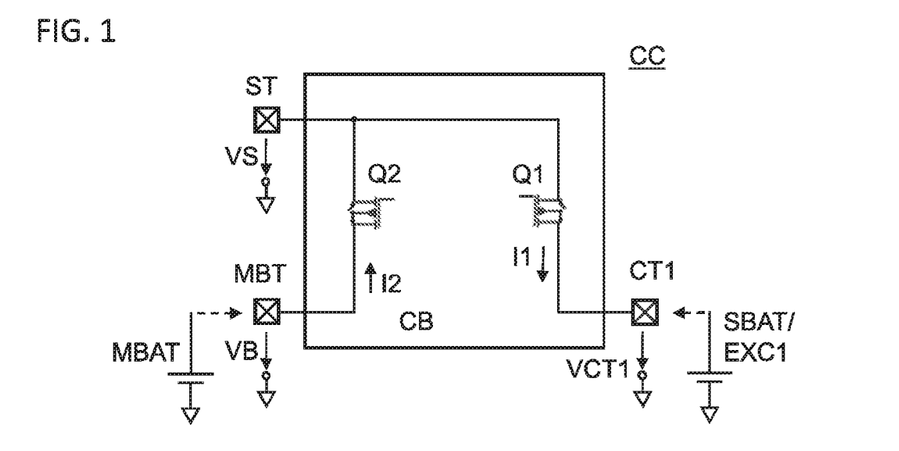
FIG. 1 shows an exemplary implementation of a charger control circuit according to the improved concept.

In FIG. 1, an exemplary implementation of a charger control circuit CC according to the improved concept is shown. The charger control circuit CC comprises a first circuit block CB, being for example a charger block, for example a charger block for Lithium ion batteries. The charger control circuit CC further comprises a system terminal ST connected to the first circuit block CB, a first charger terminal CT1 connected to the first circuit block CB and a main battery terminal MBT connected to the first circuit block CB. The first circuit block CB comprises a first current control element Q1 connected between the first charger terminal CT1 and the system terminal ST and a second current control element Q2 connected between the main battery terminal MBT and the system terminal ST. The main battery terminal MBT may be connected to a main battery MBAT of a portable electronic device and the first charger terminal CT1 may be connected to a secondary battery SBAT or to an external charger EXC1.

The charger control circuit CC is comprised by the portable electronic device, which may for example be a camera, a mobile telephone, a notebook computer or the like. The main battery MBAT and the secondary battery SBAT may for example also be comprised by the portable electronic device. In particular, the secondary battery SBAT may also be external to the portable electronic device.

In the shown implementation, the first and the second current control element Q1, Q2 comprise for example respective field effect transistors, in particular power p-channel MOS field effect transistors. A source terminal and a drain terminal of the first current control element Q1, in particular of the field effect transistor comprised by the first current control element Q1, are for example connected to the system terminal ST and the first charger terminal CT1, respectively. A source terminal and a drain terminal of the second current control element Q2, in particular of the field effect transistor comprised by the second current control element Q2, are for example connected to the system terminal ST and the main battery terminal MBT, respectively. Gate terminals of the first and the second current control element Q1, Q2, in particular of the field effect transistors comprised by the first and the second current control element Q1, Q2, respectively, may be controlled by the charger control circuit CC, in particular by the first circuit block CB or by an optional charger control state machine (shown in FIG. 4A) of the charger control circuit CC.

The first and the second current control elements Q1, Q2 may also comprise respective bulk switch circuitries as indicated by switches between the source terminals and substrate terminals as well as between the drain terminals and the substrate terminals of the first and the second current control elements Q1, Q2, respectively. In the shown example, the switches between the source terminals and the substrate terminals of the first and the second current control element Q1, Q2 are open, while the switches between the drain terminals and the substrate terminals of the first and the second current control element Q1, Q2 are closed. This means that in the shown example the bulk switch circuitries of the first and the second current control element Q1, Q2 have disconnected the substrate terminals of the first and the second current control element Q1, Q2 from the source terminals of the first and the second current control element Q1, Q2 and have connected the substrate terminals of the first and the second current control element Q1, Q2 to the drain terminals of the first and the second current control element Q1, Q2.

The secondary battery SBAT may be connected to the first charger terminal CT1. Then, due to an output voltage of the secondary battery SBAT, a voltage VCT1 is applied at the first charger terminal CT1. The charger control circuit CC for example performs a voltage comparison based on the voltage VCT1 applied at the first charger terminal CT1. For example, the charger control circuit CC compares the voltage VCT1 applied at the first charger terminal to a first threshold value VTH1, for example a minimum battery detection voltage. For example, the voltage VCT1 applied at the first charger terminal CT1 may be greater than the minimum battery detection voltage. The voltage VCT1 applied to the first charger terminal CT1 may further be compared to a second threshold value VTH2, for example a minimum charger detection voltage. For example, the voltage VCT1 applied at the first charger terminal CT1 may be smaller than the minimum charger detection voltage. Consequently, the charger control circuit CC may assign the voltage VCT1 applied at the first charger terminal CT1 to a second voltage range, corresponding to voltages between the first and the second threshold value. In this way, the charger control circuit CC may determine that the secondary battery SBAT is connected to the first charger terminal CT1.

Consequently, the charger control circuit CC may control the first and the second current control element Q1, Q2 in order to supply power from the secondary battery SBAT to the portable electronic device via the system terminal ST. In particular, the field effect transistor of the first current control element Q1 may be closed or conducting, while the field effect transistor of the second current control element Q2 may be open.

Alternatively, the field effect transistor of the second current control element Q2 may be closed or conducting, while the field effect transistor of the first current control element Q1 may be open in order to allow a power supply from the main battery MBAT to the portable electronic device via the system terminal ST.

Alternatively, the field effect transistors of the first and the second current control element Q1, Q2 may both be closed or conducting, such that a main charging current I2 may be supplied to the main battery terminal MBT. Consequently, the main battery MBAT, if connected to the main battery terminal MBT, may be charged by the secondary battery SBAT via the main battery terminal MBT. In this case, the output voltage of the secondary battery SBAT may for example be larger than an output voltage VB of the main battery MBAT. Then, the bulk switch circuitry of the second current control element Q2 may have disconnected the substrate terminal of the second current control element Q2 from the drain terminal of the second current control element Q2 and have connected the substrate terminal of the second current control element Q2 to the source terminal of the second current control element Q2, contrary to the situation shown in FIG. 1.

Alternatively, a secondary charging current I2 may be supplied from the main battery MBAT to the first charger terminal CT1 for example in order to charge the secondary battery SBAT. The secondary charging current I2 may be named main charging current. In this case, the output voltage VB of the main battery MBAT may for example be larger than an output voltage of the secondary battery SBAT. Then, the bulk switch circuitry of the first current control element Q1 may have disconnected the substrate terminal of the first current control element Q1 from the drain terminal of the first current control element Q1 and have connected the substrate terminal of the second current control element Q1 to the source terminal of the first current control element Q1, contrary to the situation shown in FIG. 1.

In other situations, not the secondary battery SBAT but the external charger EXC1 may be connected to the first charger terminal CT1. In such a case, due to an output voltage of the external charger EXC1, the voltage VCT1 applied at the first charger terminal CT1 may be greater than the first threshold value VTH1 and greater than the second threshold value VTH2. Consequently, the charger control circuit CC may assign the voltage VCT1 applied at the first charger terminal CT1 to a third voltage range, corresponding to voltages above second threshold value VTH2. In this way, the charger control circuit CC may determine that the external charger EXC1 is connected to the first charger terminal CT1.

Consequently, the charger control circuit CC may control the first current control element Q1 in order to supply power from the external charger EXC1 to the portable electronic device via the system terminal ST. Additionally, the charger control circuit CC may control the second current control element Q2 in order to supply the main charging current I2 to the main battery terminal MBT for example for charging the main battery MBAT by the external charger EXC1, as explained above for the secondary battery SBAT being connected to the first charger terminal CT1.

In further situations, neither the secondary battery SBAT nor the external charger EXC1 may be connected to the first charger terminal CT1. In this case, no voltage is applied to the first charger terminal CT1. Then, the charger control circuit CC may assign the voltage VCT1 applied to the first charger terminal CT1 to a first voltage range corresponding to voltages below the first threshold value VTH1.

By the bulk switch circuitries of the first and the second current control element Q1, Q2 operating as described above, it may for example be avoided that a current flows through a substrate diode of the first current control element Q1 and/or through a substrate diode of the second current control element Q2. In particular, by disconnecting the source terminal of the second current control element Q2 from the substrate terminal of the second current control element Q2 as shown in FIG. 1, a voltage being lower than the output voltage VB of the main battery MBAT may be supplied from the secondary battery SBAT to the electronic device via the system terminal ST without a current flowing from the main battery MBAT through the substrate diode of the second current control element Q2.

The charger control circuit CC, in particular the first circuit block CB may for example be implemented as an integrated circuit.

Figure 2:
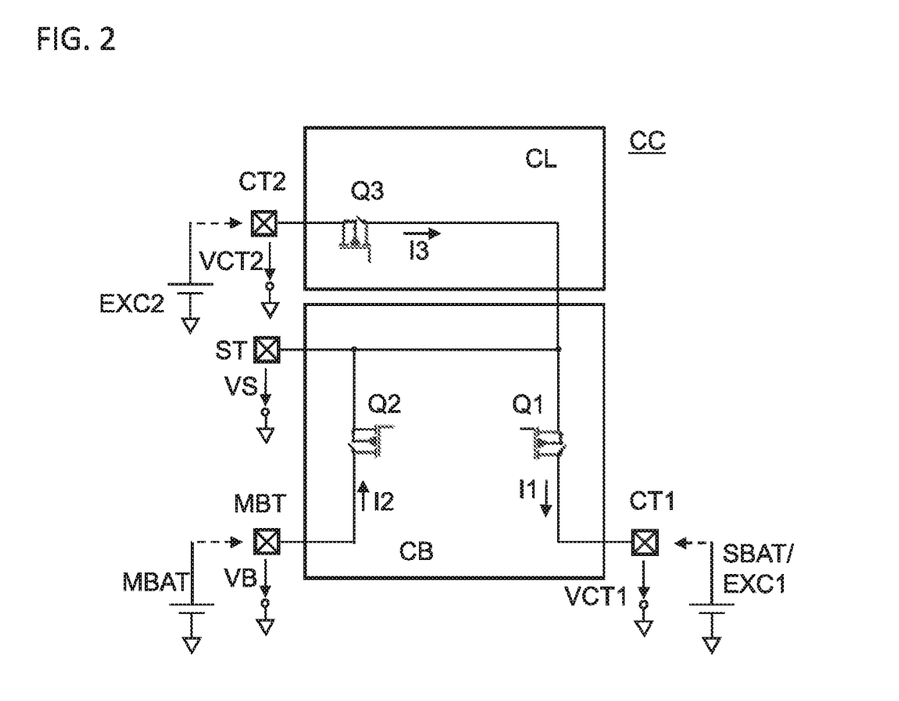
FIG. 2 shows a further exemplary implementation of a charger control circuit according to the improved concept.

FIG. 2 shows a further exemplary implementation of a charger control circuit CC according to the improved concept based on the implementation shown in FIG. 1.

In addition to the implementation shown in FIG. 1, in the implementation of FIG. 2 the charger control circuit CC further comprises a second circuit block CL, for example a power-path-and-current-limiter block. The second circuit block CL may for example be implemented as an integrated circuit, in particular the first and the second circuit block CB, CL may be implemented on the same integrated circuit or on different integrated circuits. The charger control circuit CC further comprises a second charger terminal CT2 connected to the second circuit block CL.

The second circuit block CL comprises a third current control element Q3 connected between the second charger terminal CT2 and the system terminal ST. In the shown implementation, the third current control element Q3 comprises for example a field effect transistor, in particular a power p-channel MOS field effect transistor. A source terminal and a drain terminal of the third current control element Q3, in particular of the field effect transistor comprised by the third current control element Q3, are for example connected to the system terminal ST and the second charger terminal CT2, respectively. A gate terminal of the third current control element Q3, in particular of the field effect transistor comprised by the third current control element Q3, may be controlled by the charger control circuit CC, in particular by the second circuit block CL or by the optional charger control state machine (shown in FIG. 4A).

The third current control element Q3 may also comprise a bulk switch circuitry as indicated by switches between the source terminal and a substrate terminal as well as between the drain terminal and the substrate terminal of the third current control elements Q3. In the shown example, the switches between the source terminals and the substrate terminals of the first and the second current control element Q1, Q2 are closed, while the switches between the drain terminals and the substrate terminals of the first and the second current control element Q1, Q2 are open.

In the shown example, the switch between the source terminal and the substrate terminal of the third current control element Q3 is open, while the switch between the drain terminal and the substrate terminal of the third current control element Q3 is closed. This means, in the shown example the bulk switch circuitries of the first and the second current control element Q1, Q2 have connected the substrate terminals of the first and the second current control element Q1, Q2 to the source terminals of the first and the second current control element Q1, Q2 and have disconnected the substrate terminals of the first and the second current control element Q1, Q2 from the drain terminals of the first and the second current control element Q1, Q2. Furthermore, the bulk switch circuitry of the third current control element Q3 has connected the substrate terminal of the third current control element Q3 to the drain terminal of the third current control element Q3 and disconnected the substrate terminal of the third current control element Q3 from the source terminal of the third current control element Q3.

In the shown example, a further external charger EXC2 may be connected to the second charger terminal CT2. Due to an output voltage of the further external charger EXC2, a voltage VCT2 is applied to the second charger terminal CT2. The charger control circuit CC may for example determine that the further external charger EXC2 is connected to the second charger terminal CT2 by performing a further voltage comparison. In particular, the charger control circuit CC may compare the voltage VCT2 applied at the second charger terminal CT2 to a third threshold value VTH3, for example being a further minimum charger detection voltage. Therein, the third threshold value VTH3 may or may not be equal to the second threshold value VTH2.

Consequently, the charger control circuit CC may supply power from the further external charger EXC2 to the portable electronic device via the system terminal ST if a predetermined priority of the second charger terminal CT2 is higher than a predetermined priority of the first charger terminal CT1. In this case, the field effect transistor comprised by the third current control element Q3 may be closed or conducting. Furthermore, the charger control circuit CC may for example supply a secondary charging current I1 to the first charger terminal CT1 for example for charging the secondary battery SBAT from the further external charger EXC2, for example while also supplying the power to the electronic device from the further external charger EXC2. To this end, the field effect transistor comprised by the first current control element Q1 may for example be closed or conducting. At the same time, the field effect transistor comprised by the second current control element Q2 may for example be open such that no current flows from or to the main battery MBAT.

If, on the other hand, the priority of the first charger terminal CT1 is higher than the priority of the second charger terminal CT2, the charger control circuit CC may supply power from the secondary battery SBAT or from the main battery MBAT to the electronic device via the system terminal ST as described with respect to FIG. 1.

Alternatively, the field effect transistors comprised by the first, the second and the third current control element Q1, Q2, Q3 may all be closed or conducting. Consequently, power may be supplied from the further external charger EXC2 to the portable electronic device via the system terminal ST. At the same time, the secondary charging current I1 may be supplied to the first charger terminal CT1 for example for charging the secondary battery SBAT and the main charging current I2 may be supplied to the main battery terminal MBT for example for charging the main battery MBAT.

Figure 3:
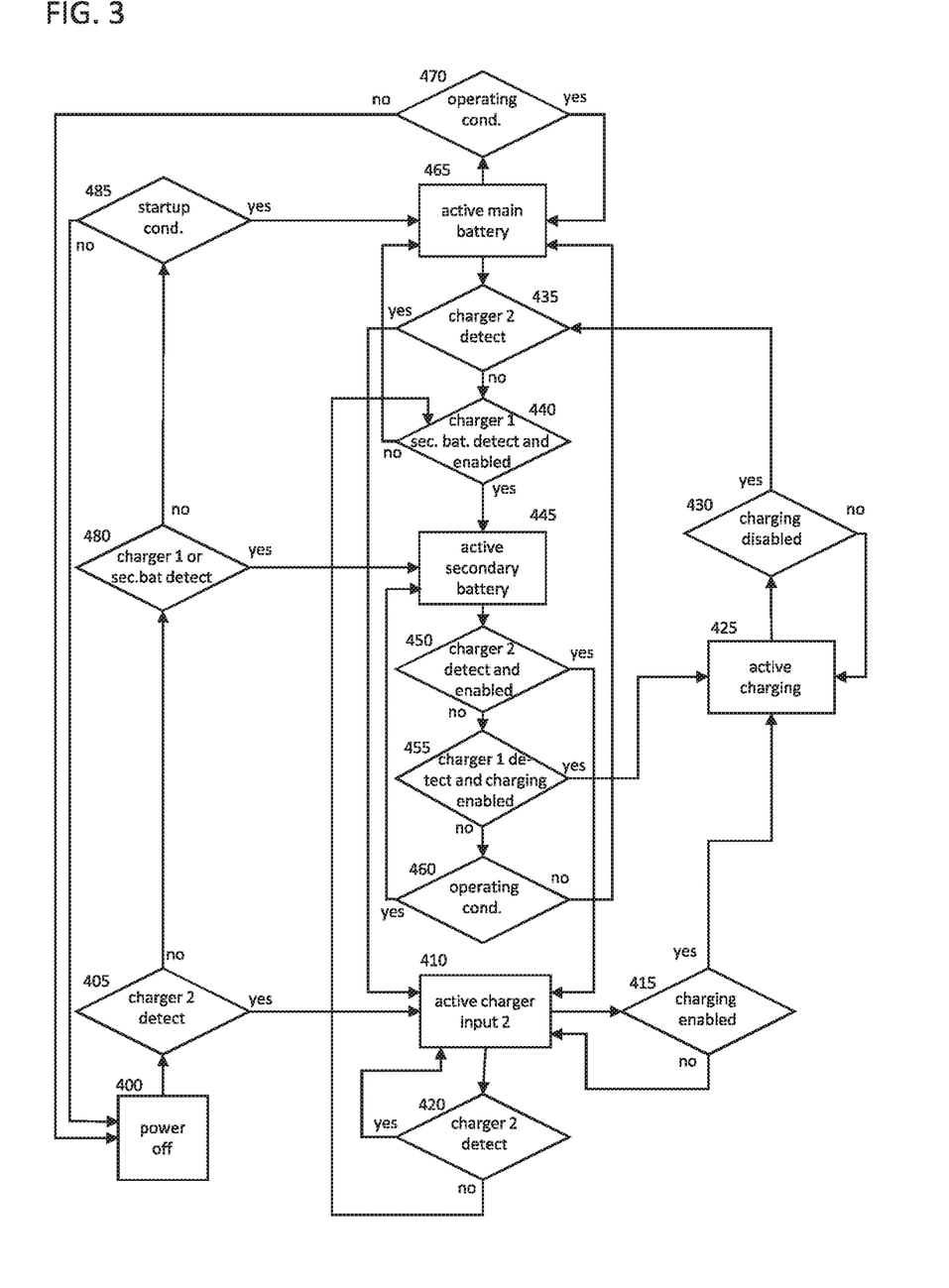
FIG. 3 shows a flow chart of an exemplary implementation of a method according to the improved concept.

FIG. 3 shows a flow chart of an exemplary implementation of a method according to the improved concept.

The flowchart starts with block 400, where the portable electronic device is powered off. In block 405 is determined whether the further external charger EXC2 is connected to the second charger terminal CT2 as described above, for example with respect to FIG. 2. If it is found that the further external charger EXC2 is connected to the second charger terminal CT2, the charger control circuit may enter an operating mode of block 410 denoted as "active charger input 2". During the operating mode of block 410, power may be supplied from the further external charger EXC2 to the portable electronic device via the system terminal ST as described with respect to FIG. 2. In this operating mode, the portable electronic device may for example be started up using power from the further external charger EXC2. Furthermore, in this operating mode, the main battery MBAT and the secondary battery SBAT, if connected to the first charger terminal CT1, are for example not charged.

During the operating mode of block 410, it may for example repeatedly be determined whether charging is enabled according to block 415. If charging is not enabled, the operating mode remains the operating mode of block 410. Further, during the operating mode of block 410, it may for example repeatedly be determined in block 420 whether the further external charger EXC2 is connected to the second charger terminal CT2. If the further external charger EXC2 is connected to the second charger terminal CT2, the operating mode remains the operating mode of block 410.

If it is determined in block 415 that charging is enabled, the charger control circuit CC may enter an operating mode of block 425 denoted as "active charging". In case the operating mode of block 425 is entered from the operating mode of block 410, power may be supplied from the further external charger EXC2 to the portable electronic device via the system terminal ST as for the operating mode of block 410. However, also the main battery MBAT and/or the secondary battery SBAT, if connected to the first charger terminal CT1, may be charged in the operating mode of block 425.

During the operating mode of block 425, it may for example repeatedly be checked in block 430 if charging is disabled. If it is found that charging is not disabled, the operating mode may remain the operating mode of block 425.

On the other hand, if it is determined in block 430 that charging is disabled, it may be proceeded with block 435. In block 435 it is determined whether the further external charger EXC2 is connected to the second charger terminal CT2. If it is found that the further external charger EXC2 is not connected to the second charger terminal CT2, it may be proceeded with block 440. Furthermore, if it is determined in block 420 that the further external charger EXC2 is not connected to second charger terminal CT2, it may also be proceeded with block 440.

In block 440, it is determined whether one of the secondary battery SBAT and the external charger EXC1 is connected to the first charger terminal CT1 and whether the first charger terminal CT1 is enabled as an input for operation of the secondary battery SBAT. If it is found in block 435 that the further external charger EXC2 is connected to the second charger terminal CT2, the charger control circuit CC may for example enter the operating mode of block 410 and it may be proceeded as described above.

If it is found in block 440 that one of the secondary battery SBAT and the external charger EXC1 is connected to the first charger terminal CT1 and that the first charger terminal CT1 is enabled as an input for operation of the secondary battery SBAT, the charger control circuit CC may enter the operating mode of block 445 denoted as "active secondary battery". During the operating mode of block 445, power may be supplied from the secondary battery SBAT or the external charger EXC1 to the portable electronic device via the system terminal ST. For example, the main battery MBAT may be not charged in this operating mode. During the operating mode of block 445, it may for example be repeatedly checked in block 450 whether the further external charger EXC2 is connected to the second charger terminal CT2 and whether the second charger terminal CT2 is enabled. If it is determined that the further external charger EXC2 is connected to the second charger terminal CT2 and the second charger terminal is enabled, the charger control circuit CC may enter the operating mode of block 410 and proceed as described before. If it is determined in block 450 that the further external charger EXC2 is not connected to the second charger terminal CT2 or that the second charger terminal CT2 is not enabled, it is proceeded with block 455.

In block 455 is determined whether the external charger EXC1 is connected to the first charger terminal CT1 and whether charging is enabled. If it is found that the external charger EXC1 is connected to the first charger terminal CT1 and that charging is enabled, the operating mode of block 425 may be entered. If the operating mode of block 425 is entered in this way, power may for example be supplied from the external charger EXC1 to the portable electronic device via the system terminal ST. Furthermore, the main battery MBAT may be charged from the external charger EXC1.

If it is found in block 455 that the external charger EXC1 is not connected to the first charger terminal CT1 or that charging is not enabled, it is proceeded with block 460. In block 460, it is determined whether a supply voltage VS for example applied at the system terminal ST is smaller than a minimum operating voltage VOP or whether the first charger terminal CT1 is disabled for operation from a secondary battery SBAT. If it is found that the supply voltage VS is not smaller than the minimum operating voltage VOP and that the first charger terminal CT1 is not disabled, the operating state may remain the operating state of 445.

If, on the other hand it is found that the supply voltage VS is smaller than the minimum operating voltage VOP or that the first charger terminal CT1 is disabled, the charger control circuit CC may enter the operating mode of block 465, denoted as "active main battery". During the operating mode of block 465, power may be supplied from the main battery MBAT to the portable electronic device via the system terminal ST. The operating mode of block 465 may also be entered if it is found in block 440 that neither the secondary battery SBAT nor the external charger EXC1 is connected to the first charger terminal CT1 or that the first charger terminal CT1 is not enabled.

During the operating mode of block 465, it may for example be repeatedly checked in block 435 whether the further external charger EXC2 is connected to the second charger terminal CT2. It is then proceeded as described above for block 435. Furthermore, during the operating mode of block 465 it may for example be repeatedly checked in block 470 whether the supply voltage VS is smaller than the operating voltage VOP. If it is found that the supply voltage VS is smaller than the operating voltage VOP, the portable electronic device may be powered off in block 400. If it is found in block 470 that the supply voltage VS is not smaller than the operating voltage VOP, the operating mode may remain the operating mode of block 465.

If it is determined in block 405 that the further external charger EXC2 is not connected to the second charger terminal CT2, it is determined in block 480 whether one of the external charger EXC1 or the secondary battery SBAT is connected to the first charger terminal CT1. If it is found that one of the external charger EXC1 or the secondary battery SBAT is connected to the first charger terminal CT1, the portable electronic device may for example be started up using power from the external charger EXC1 or the secondary battery SBAT and it may be proceeded with the operating mode of block 445 as described above.

If it is determined in block 480 that neither the external charger EXC1 nor the secondary battery SBAT is connected to the first charger terminal CT1 it may be determined in block 485 whether startup conditions for the main battery MBAT are fulfilled. If the startup conditions for the main battery MBAT are fulfilled, the portable electronic device may for example be started up using power from the main battery MBAT and it may be proceeded with the operating mode of block 465 as described above. If the startup conditions for the main battery MBAT are found to be not fulfilled in block 485, the portable electronic device may remain powered off in block 400.

The method displayed by the flowchart of FIG. 3 corresponds to an implementation according to the improved concept, wherein the priority of the second charger terminal CT2 is higher than the priority of the first charger terminal CT1. In alternative implementations, the priority of the first charger terminal CT1 may be higher than the priority of the second charger terminal CT2. The blocks of FIG. 3 may then be rearranged accordingly.

Figure 4A:
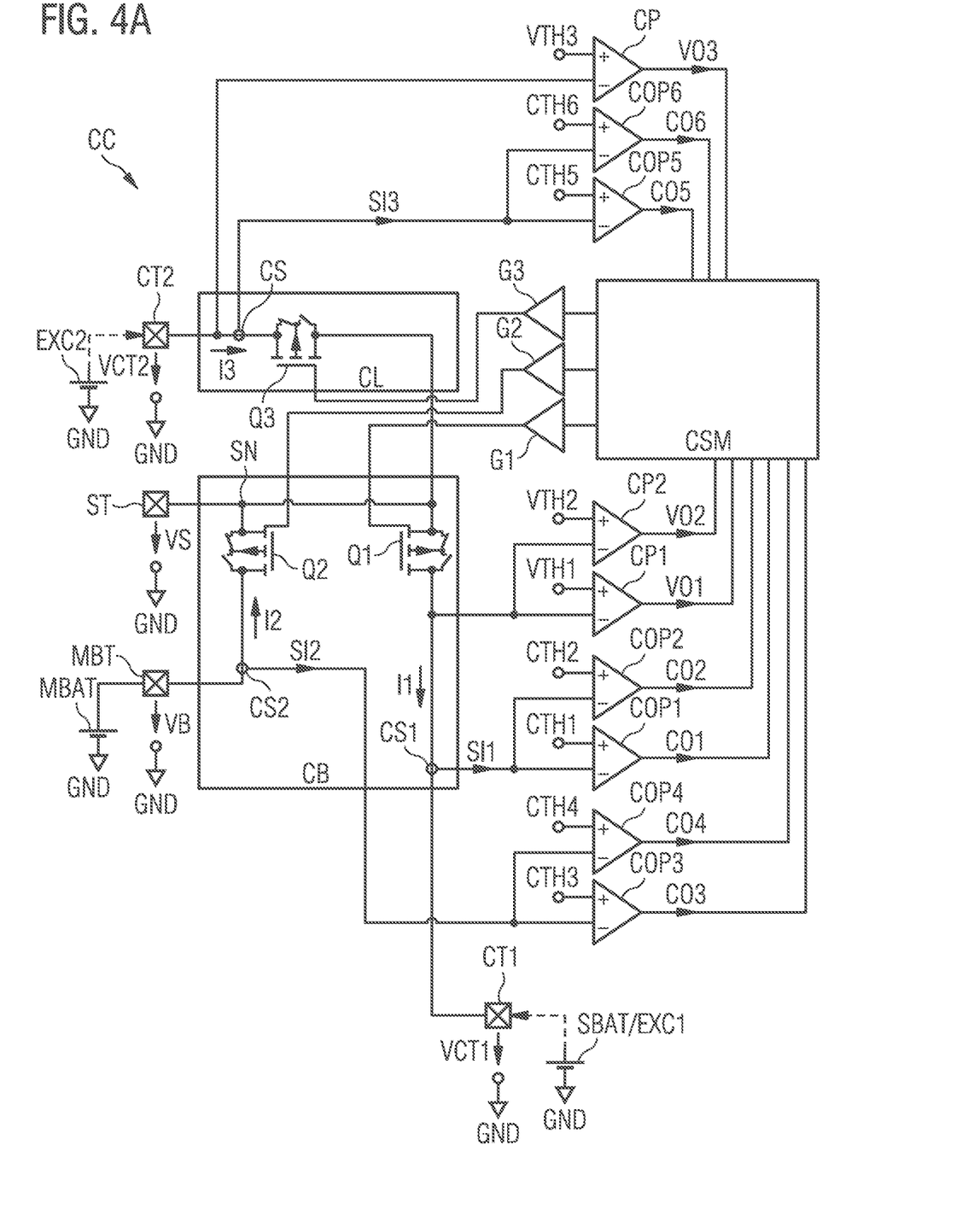
FIGS. 4A to 4C show an additional exemplary implementation of a charger control circuit according to the improved concept.

The charger control circuit CC according to the improved concept may for example further comprise a charger control state machine (shown in FIG. 4A). The charger control state machine may for example control the first, the second and/or the third current control element Q1, Q2, Q3. In particular, the charger control state machine may control the bulk switch circuitries and/or voltages at the gate terminals of the first, the second and/or the third current control element Q1, Q2, Q3. The charger control state machine may also perform further tasks, for example tasks described with respect to the method of FIG. 3.

By means of the improved concept, power may be supplied from the secondary battery SBAT to the portable electronic device without a boost of the output voltage of the secondary battery SBAT being necessary. Therefore, costs may be reduced and an efficiency of the power supply via the secondary battery SBAT may be improved. In several implementations, also additional connectors or connector pins for attaching the secondary battery SBAT may be not needed due to the improved concept.

Furthermore, the secondary battery SBAT may be charged by the further external charger EXC2 without the need of a dedicated battery charger. In particular, the secondary battery SBAT may be charged simultaneously with the main battery MBAT. In addition, supplying power from the secondary battery SBAT to the portable electronic device is possible also when the output voltage of the secondary battery SBAT falls below the output voltage VB of the main battery MBAT.

Furthermore, a charging and/or discharging of the main battery MBAT and the secondary battery SBAT may be controlled by a single circuit block of an integrated circuit, for example by the first circuit block CB, which may be a charger block.

FIG. 4A shows an additional exemplary implementation of the charger control circuit CC according to the improved concept. The charger control circuit CC comprises a charger control state machine CSM that is coupled to the first and the second current control element Q1, Q2. Thus, the charger control circuit CC comprises a first and a second gate driver G1, G2. The first gate driver G1 couples an output of the charger control state machine CSM to a gate terminal of the first current control element Q1. Correspondingly, the second gate driver G2 couples a further output of the charger control state machine CSM to the gate terminal of the second current control element Q2. The first charger terminal CT1 is enabled by setting the first current control element Q1 in a conducting state. The first charger terminal CT1 is disabled (or not enabled) by setting the first current control element Q1 in a non-conducting state. The second charger terminal CT2 is enabled by setting the second current control element Q2 in a conducting state. The second charger terminal CT2 is disabled (or not enabled) by setting the second current control element Q2 in a non-conducting state. A current control element Q1, Q2, Q3 is open, if the current control element Q1, Q2, Q3 is set in a conducting state. A current control element Q1, Q2, Q3 is closed, if the current control element Q1, Q2, Q3 is set in a non-conducting state.

Additionally, the charger control state machine CSM is also coupled to the third current control element Q3. Thus, a third gate driver G3 of the charger control circuit CC is arranged between an additional output of the charger control state machine CSM and the gate terminal of the third current control element Q3. The charger control state machine CSM generates control signals and provides the control signals via the first to the third gate driver G1 to G3 to the gate terminals of the first to the third current control elements Q1, Q2, Q3.

The charger control circuit CC comprises a first and a second comparator CP1, CP2 each having a first input connected to the first charger terminal CT1. A first and a second output of a not-shown reference voltage source are connected to a second input of the first comparator CP1 and to a second input of the second comparator CP2.

The voltage VCT1 can be tapped at the first charger terminal CT1 and is provided to the first inputs of the first and the second comparator CP1, CP2. The first threshold value VTH1 is applied to the second input of the first comparator CP1. Correspondingly, the second threshold value VTH2 is applied to the second input of the second comparator CP2. An output of the first comparator CP1 and an output of the second comparator CP2 are connected to inputs of the charger control state machine CSM. The second threshold value VTH2 is larger than the first threshold value VTH1. The first and the second comparator CP1, CP2 may form a window comparator. The first comparator CP1 provides a first comparator signal VO1 to the charger control state machine CSM as a result of a comparison of the voltage VCT1 with the first threshold voltage VTH1. Similarly, the second comparator CP2 provides a second comparator signal VO2 to the charger control state machine CSM as a result of a comparison of the voltage VCT1 with the second threshold value VTH2.

The charger control circuit CC comprises a comparator CP having a first input connected to the second charger terminal CT2. The second input of the comparator CP is connected to a further output of the not-shown reference voltage source. An output of the comparator CP is connected to an input of the charger control state machine CSM. The voltage VCT2 can be tapped at the second charger terminal CT2. The voltage VCT2 is provided to the first input of the comparator CP. The further threshold voltage that can also be named third threshold voltage VTH3 is applied to the second input of the comparator CP. The comparator CP generates a comparator signal VO3 as a result of a comparison of the voltage VCT2 with the further threshold voltage VTH3 and provides it to the charger control state machine CSM. The charger control state machine CSM determines whether the further external charger EXC2 is connected to the second charger terminal CT2 by comparing the voltage VCT2 to the further threshold value VTH3 by the comparator CP.

The first circuit block CB comprises a first current sensor CS1. The first current sensor CS1 may be arranged between the first current control element Q1 and the first charger terminal CT1. On its output side the first current sensor CS1 is coupled to the charger control state machine CSM. The first current sensor CS1 measures a current flowing through the first charger terminal CT1. The first current sensor CS1 measures the secondary charging current I1. Additionally, the charger control circuit CC comprises a first and a second comparator circuit COP1, COP2 having first inputs coupled to the output of the first current sensor CS1. Thus, an output signal SI1 of the first current sensor CS1 is provided to the first inputs of the first and the second comparator circuit COP1, COP2. A first current threshold CTH1 is provided to a second input of the first comparator circuit COP1. Similarly, a second current threshold CTH2 is applied to a second input of the second comparator circuit COP2. On its output side the first and the second comparator circuit COP1, COP2 are connected to inputs of the charger control state machine CSM.

The first comparator circuit COP1 generates a first comparator circuit signal CO1 as a function of a comparison of the first current sensor signal SI1 with the first current threshold CTH1 and provides it to the charger control state machine CSM. Correspondingly, the second comparator circuit COP2 generates a second comparator circuit signal CO2 as a function of a comparison of the first current sensor signal SI1 and the second current threshold CTH2 and provides it to the charger control state machine CSM. The first current threshold CTH1 is smaller than the second current threshold CTH2. The first current threshold CTH1 may be or corresponds to a specified first minimum current value. The second current threshold CTH2 may be or corresponds to a specified first maximum current value.

The charger control state machine CSM may control the first current control element Q1 as a function of the second comparator circuit signal CO2 such that the secondary charging current I1 from and/or to the charger control circuit CC via the first charger terminal CT1 is less than the specified first maximum current value. Alternatively or additionally, the charger control state machine CSM may control the first current control element Q1 as a function of the first comparator circuit signal CO1 such that the secondary charging current I1 from and/or to the charger control circuit CC via the first charger terminal CT1 is higher than the specified first minimum current value. As shown in FIG. 3, the first current control element Q1 is also controlled depending on other criteria.

The first circuit block CB comprises a second current sensor CS2. On its output side the second current sensor CS2 is coupled to the charger control state machine CSM. The second current sensor CS2 measures a current flowing through the main battery terminal MBT. The second current sensor CS2 measures the main charging current I2. The second current sensor CS2 is arranged between the main battery terminal MBT and the second current control element Q2. In an alternative embodiment, not shown, the second current sensor CS2 may be implemented between the second current control element Q2 and a summing node SN. The summing node SN is connected to the first current control element Q1, to the second current control element Q2 and to the system terminal ST.

Additionally, the charger control circuit CC comprises a third and a fourth comparator circuit COP3, COP4 having first inputs receiving an output signal SI2 of the second current sensor CS2. A third current threshold CTH3 is provided to a second input of the third comparator circuit COP3. Similarly, a fourth current threshold CTH4 is applied to a second input of the fourth comparator circuit COP4. The third comparator circuit COP3 generates a third comparator circuit signal CO3 as a function of a comparison of the second current sensor signal SI2 with the third current threshold CTH3 and provides it to the charger control state machine CSM. Correspondingly, the fourth comparator circuit COP4 generates a fourth comparator circuit signal CO4 as a function of a comparison of the second current sensor signal SI2 and the fourth current threshold CTH4 and provides it to the charger control state machine CSM. The third current threshold CTH3 is smaller than the fourth current threshold CTH4. The third current threshold CTH3 may be or corresponds to a specified second minimum current value. The fourth current threshold CTH4 may be or corresponds to a specified second maximum current value.

The charger control state machine CSM may control the second current control element Q2 as a function of the fourth comparator circuit signal CO4 such that the main charging current I2 from and/or to the charger control circuit CC via the main battery terminal MBT is less than the specified second maximum current value. Alternatively or additionally, the charger control state machine CSM may control the second current control element Q2 as a function of the third comparator circuit signal CO3 such that the main charging current I2 from and/or to the charger control circuit CC via the main battery terminal MBT is higher than the specified second minimum current value. As shown in FIG. 3, the second current control element Q2 is also controlled depending on other criteria.

The second circuit block CL comprises a current sensor CS. The current sensor CS is connected on its output side to the charger control state machine CSM. The current sensor CS is arranged between the third current control element Q3 and the second charger terminal CT2. Alternatively, the current sensor CS may be arranged between the third current control element Q3 and the summing node SN. The current sensor CS measures a third current I3 flowing through the third current control element Q3. The current sensor CS measures the third current I3 flowing through the second charger terminal CT2.

Additionally, the charger control circuit CC comprises a fifth and a sixth comparator circuit COP5, COP6 having first inputs receiving a current sensor signal SI of the current sensor CS. A fifth current threshold CTH5 is provided to a second input of the fifth comparator circuit COP5. Similarly, a sixth current threshold CTH6 is applied to a second input of the sixth comparator circuit COP6. The fifth comparator circuit COP5 generates a fifth comparator circuit signal CO5 as a function of a comparison of the current sensor signal SI with the fifth current threshold CTH5 and provides it to the charger control state machine CSM. Correspondingly, the sixth comparator circuit COP6 generates a sixth comparator circuit signal CO6 as a function of a comparison of the current sensor signal SI and the sixth current threshold CTH6 and provides it to the charger control state machine CSM. The fifth current threshold CTH5 is smaller than the sixth current threshold CTH6. The fifth current threshold CTH5 may be or corresponds to a specified third minimum current value. The sixth current threshold CTH6 may be or corresponds to a third specified maximum current value.

The charger control state machine CSM may control the third current control element Q3 as a function of the sixth comparator circuit signal COP6 such that the third current I3 from and/or to the charger control circuit CC via the second charger terminal CT2 is less than the specified third maximum current value. Alternatively or additionally, the charger control state machine CSM may control the third current control element Q3 as a function of the fifth comparator circuit signal COP5 such that the third current I3 from and/or to the charger control circuit CC via the second charger terminal CT2 is higher than the specified third minimum current value. As shown in FIG. 3, the third current control element Q3 is also controlled depending on other criteria.

The current sensor signals SI1, SI2, SI and the current thresholds CTH1 to CTH6 may be realized as voltages. Thus, the first to the sixth comparator circuits COP1 to COP6 are voltage comparators. Alternatively, the current sensor signals SI1, SI2, SI and the current thresholds CTH1 to CTH6 are implemented in the form of a current. Thus, the first to the sixth comparator circuits COP1 to COP6 are designed in the form of current comparators.

The first charger terminal CT1 is configured as an input and as an output terminal. The secondary charging current I1 may have positive or negative values. The currents I2 and I3 may also have positive or negative values. The current sensor signals SI1, SI2, SI may represent an amount of the currents I1 to I3. Thus, any overcurrent flowing through the terminals CT1, CT2, MBT is avoided independent of the direction of the currents I1 to I3. Alternatively, the current sensor signals SI1, SI2, SI provide the information about the direction and about the amount of the currents I1 to I3.

In an alternative embodiment, not shown, at least one of the circuit parts that are arranged as external circuit parts of the first and the second circuit block CB, CL are realized inside the first and/or the second circuit block CB, CL. Thus, for example, the first and the second gate driver G1, G2 may be implemented in the first circuit block CB. Correspondingly, the third gate driver G3 may be realized in the second circuit block CL. Additionally, the comparators CP1, CP2, COP1 to COP4 may be implemented in the first circuit block CB. Correspondingly, the comparators CP, COP5, COP6 may be implemented in the second circuit block CL. Additionally, the charger control state machine CSM may be implemented in the first or the second circuit block CB, CL.

In an alternative embodiment, not shown, a further comparator compares the supply voltage VS applied at the system terminal ST with the minimum operating voltage VOP and provides the result of comparison to the charger control state machine CSM.

In an alternative, not shown embodiment, the charger control circuit CC comprises a logic circuitry, a microprocessor or a microcontroller instead of the charger control state machine CSM. The logic circuitry, the microprocessor or the microcontroller are connected such as the charger control state machine CSM shown in FIG. 4A and perform the above described steps.

Figure 4B:
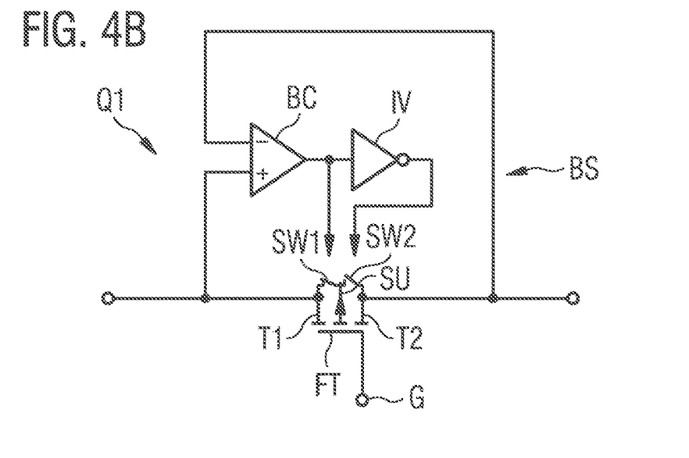

FIG. 4B shows a detail of an implementation of the charger control circuit CC. As shown in FIG. 4B, the first current control element Q1 comprises the field effect transistor FT and the bulk switch circuitry BS. The field effect transistor FT comprises a gate terminal G, a substrate terminal SU and a first and a second terminal T1, T2. The first terminal T1 may be a drain terminal of the field effect transistor FT and the second terminal T2 may be a source terminal of the field effect transistor FT. Alternatively, the first terminal T1 may be a source terminal of the field effect transistor FT and the second terminal T2 may be a drain terminal of the field effect transistor FT.

The bulk switch circuitry BS comprises a control comparator BC having a first input coupled to the first terminal T1 and a second input coupled to the second terminal T2. The bulk switch circuitry BS comprises a first and a second switch SW1, SW2. The first switch SW1 connects the first terminal T1 to the substrate terminal SU and the second switch SW2 connects the second terminal T2 to the substrate terminal SU. An output of the control comparator BC is connected to a control terminal of the first switch SW1. The bulk switch circuitry BS comprises an inverter IV that is connected on its input side to the output of the control comparator BC and on its output side to a control terminal of the second switch SW2.

The field effect transistor is realized as a p-channel metal-oxide-semiconductor field effect transistor. The bulk switch circuitry BS is designed to provide the higher voltage of the two voltages that can be tapped at the first and the second terminal T1, T2 to the substrate terminal SU. Thus, in the case that the voltage tapped at the first terminal T1 is higher than the voltage of the second terminal T2, the control comparator BC sets the first switch SW1 in a conducting state and the inverter IV sets the second switch SW2 in a non-conducting state. If the voltage at the second terminal T2 is higher than the voltage at the first terminal T1, the control comparator BC sets the first switch SW1 in a non-conducting state and the inverter IV sets the second switch SW2 in a conducting state.

In an alternative embodiment, not shown, the field effect transistor FT is realized as an n-channel metal-oxide-semiconductor field effect transistor. Thus, the voltage at the substrate terminal SU is set to the lower voltage of the two voltages that can be tapped at the first and the second terminal T1, T2.

The bulk switch circuitry of the second and the third current control elements Q2, Q3 may be realized such as the bulk switch circuitry BS of the first current control element Q1. Advantageously, the first to the third current control elements Q1 to Q3 are free from a current flowing through a substrate to source diode or a substrate to drain diode.

Figure 4C:
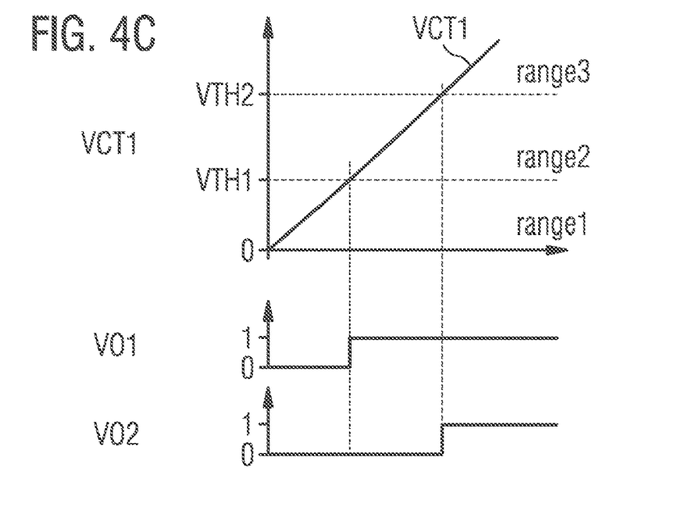

FIG. 4C shows exemplary signals of the charger control circuit CC. In FIG. 4C the dependency of the first and the second comparator signals VO1, VO2 as a function of the voltage VCT1 tapped at the first charger terminal CT1 is shown. The first threshold value VTH1 may be between 0 V and the second threshold voltage value VTH2. The voltage VCT1 that is applied at the first charger terminal CT1 is assigned to the first, the second or the third voltage range by performing two voltage comparisons.

In the first voltage range, the voltage VCT1 is less than the first threshold value VTH1. Thus, the first and the second comparator signal VO1, VO2 have a first logical value that may be zero. Thus, the voltage VCT1 is assigned to the first voltage range. Thus, the charger control state machine CSM determines that none of the secondary battery SBAT and the first external charger EXC1 is connected to the first charger terminal CT1 (or is connected and does not operate in an appropriate way).

In the second voltage range, the voltage VCT1 is larger than the first threshold value VTH1 and less than the second threshold value VTH2. Thus, the first comparator signal VO1 has a second logical value and the second comparator signal VO2 has the first logical value. The second logical value may be 1. Thus, the voltage VCT1 is assigned to the second voltage range. Thus, the charger control state machine CSM determines that the secondary battery SBAT is connected to the first charger terminal CT1.

In the third voltage range, the voltage VCT1 is higher than the second threshold value VTH2. Thus, the first and the second comparator signal VO1, VO2 have the second logical value. Thus, the voltage VCT1 is assigned to the third voltage range. Thus, the charger control state machine CSM determines that the first external charger EXC1 is connected to the first charger terminal CT1.

In an alternative, not shown embodiment, the second comparator CP2 is omitted. The first and the second threshold value VTH1, VTH2 are alternatively provided to the second input of the first comparator CP1. Thus, the voltage VCT1 is compared in a first phase with the first threshold value VTH1 and is compared in a second phase with the second threshold value VTH2. The first comparator signal VO1 is generated in the first phase and the second comparator value VO2 is generated in the second phase.

In an alternative non-shown embodiment, the charger control circuit CC comprises more than two comparators CP1, CP2 which compare the voltage VCT1 with threshold voltages. Thus, the voltage VCT1 may be compared with more than two threshold voltages and may be assigned to voltage ranges that are defined in another way than as shown in FIG. 4C.

Figure 5:
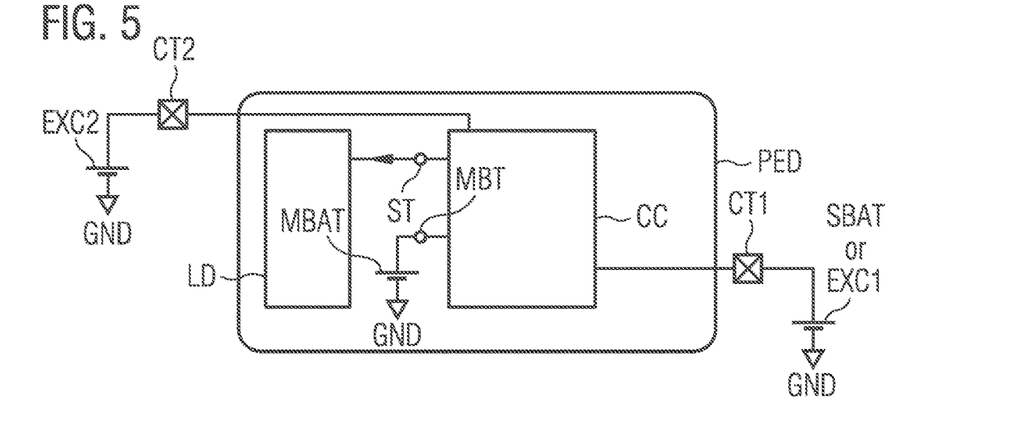
FIG. 5 shows an exemplary implementation of a portable electronic device.

FIG. 5 shows an exemplary implementation of a portable electronic device PED. The portable electronic device PED comprises the charger control circuit CC and the main battery MBAT. The first and the second charger terminals CT1, CT2 are terminals of the portable electronic device PED. Thus, the portable electronic device PED may be free from the secondary battery SBAT, the first external charger EXC1 and the second external charger EXC2. These voltage sources can be connected to the first and the second charger terminals CT1, CT2. The portable electronic device PED comprises a load LD that is connected to the system terminal ST. The load LD is supplied by the supply voltage VS that is provided via the system terminal ST. The load LD may be, for example, a display, a microprocessor, a microcontroller and/or an optical sensor arrangement such as a camera chip.

In an alternative, not shown, embodiment, the secondary battery SBAT and/or the first external charger EXC1 are included in the portable electronic device PED.

What is claimed is:

1. A charger control circuit for a portable electronic device, the charger control circuit comprising:
    a first charger terminal, and
    a system terminal,
    wherein the charger control circuit is configured to:
        provide an assignment of a voltage applied at the first charger terminal to one of at least three voltage ranges by performing at least one voltage comparison,
            wherein a first voltage range of the at least three voltage ranges corresponds to voltage values below a first threshold value, a second voltage range of the at least three voltage ranges corresponds to voltage values above the first threshold value and below a second threshold value, and a third voltage range of the at least three voltage ranges corresponds to voltage values above the second threshold value,
            wherein the second threshold value is greater than the first threshold value, and
            wherein the first threshold value corresponds to a minimum battery detection voltage and the second threshold value corresponds to a minimum charger detection voltage;
        determine and distinguish, based on the assignment, whether an external charger or a secondary battery is connected to the first charger terminal; and
        depending on a predetermined operating state of the first charger terminal:
            supply power from the secondary battery to the portable electronic device via the system terminal when the secondary battery is connected to the first charger terminal, and
            supply power from the external charger to the portable electronic device via the system terminal when the external charger is connected to the first charger terminal.

2. The charger control circuit according to claim 1, wherein the predetermined operating state of the first charger terminal corresponds to an enabling or a disabling of the first charger terminal.

3. The charger control circuit according to claim 1, further comprising a first current control element connected between the first charger terminal and the system terminal, wherein the charger control circuit is configured to control, by the first current control element, a current from and/or to the charger control circuit via the first charger terminal.

4. The charger control circuit according to claim 3, wherein the control of the current from and/or to the charger control circuit via the first charger terminal is based on a comparison of a value of the current from and/or to the charger control circuit via the first charger terminal to a specified first minimum current value and to a specified first maximum current value and/or to a specified first current range.

5. The charger control circuit according to claim 1, further comprising a second charger terminal, and
    wherein the charger control circuit is further configured to:
        determine whether a further external charger is connected to the second charger terminal by performing a further voltage comparison; and
        when the further external charger is connected to the second charger terminal:
            supply power from the further external charger to the portable electronic device via the system terminal if a predetermined priority of the second charger terminal is higher than a predetermined priority of the first charger terminal, and
            supply power from the secondary battery or from the external charger to the portable electronic device via the system terminal if the priority of the first charger terminal is higher than the priority of the second charger terminal.

6. The charger control circuit according to claim 5, wherein the charger control circuit is further configured to supply a secondary charging current to the first charger terminal for charging the secondary battery from the further external charger when supplying power from the further external charger to the portable electronic device.

7. The charger control circuit according to claim 5, further comprising a main battery terminal adapted to connect a main battery, and
    wherein the charger control circuit is further configured to:
        supply a main charging current to the main battery terminal from at least one of the external charger and the further external charger when supplying power from the further external charger to the portable electronic device.

8. The charger control circuit according to claim 1, further comprising a main battery terminal adapted to connect a main battery.

9. The charger control circuit according to claim 8, wherein the charger control circuit is further configured to supply a main charging current to the main battery terminal from the external charger when supplying power from the external charger to the portable electronic device.

10. The charger control circuit according to claim 8, wherein the charger control circuit is further configured to supply the main charging current to the main battery terminal from the secondary battery when supplying power from the secondary battery to the portable electronic device.

11. The charger control circuit according to claim 8, further comprising a second current control element connected between the main battery terminal and the system terminal, and
wherein the charger control circuit is further configured to control a current from and/or to the charger control circuit via the main battery terminal.

12. The charger control circuit according to claim 11, wherein the second current control element comprises a field effect transistor and a bulk switch circuitry, the bulk switch circuitry being configured to connect and disconnect a substrate terminal of the second current control element to and from, respectively, a source terminal of the second current control element and/or a drain terminal of the second current control element, depending on a ratio of a voltage applied to the main battery terminal and the voltage applied to the first charger terminal.

13. A method for charger control in a portable electronic device, the method comprising:
providing an assignment of a voltage applied at a first charger terminal of a charger control circuit to one of at least three voltage ranges by performing at least one voltage comparison,
wherein a first voltage range of the at least three voltage ranges corresponds to voltage values below a first threshold value, a second voltage range of the at least three voltage ranges corresponds to voltage values above the first threshold value and below a second threshold value, and a third voltage range of the at least three voltage ranges corresponds to voltage values above the second threshold value,
wherein the second threshold value is greater than the first threshold value, and
wherein the first threshold value corresponds to a minimum battery detection voltage and the second threshold value corresponds to a minimum charger detection voltage;
determining and distinguishing, based on the assignment, whether an external charger or a secondary battery is connected to the first charger terminal; and
depending on a predetermined operating state of the first charger terminal:
supplying power from the secondary battery to the portable electronic device via a system terminal of the charger control circuit when the secondary battery is connected to the first charger terminal, and
supplying power from the external charger to the portable electronic device via the system terminal when the external charger is connected to the first charger terminal.

14. The method according to claim 13, wherein the predetermined operating state of the first charger terminal corresponds to an enabling or disabling of the first charger terminal.

15. The method according to claim 13, wherein the charger control circuit further comprises a main battery terminal adapted to connect a main battery, and
the method further comprising supplying a main charging current to the main battery terminal from the external charger when supplying power from the external charger to the portable electronic device.

16. The method according to claim 13, wherein the charger control circuit further comprises a main battery terminal adapted to connect a main battery, and
the method further comprising supplying the main charging current to the main battery terminal from the secondary battery when supplying power from the secondary battery to the portable electronic device.

17. The method according to claim 13, further comprising:
controlling, by a first current control element connected between the first charger terminal and the system terminal, a current from and/or to the charger control circuit via the first charger terminal, and
controlling by a second current control element a current from and/or to the charger control circuit via a main battery terminal of the charger control circuit, the main battery terminal being adapted to connect a main battery.

18. The method according to claim 17, wherein the second current control element comprises a field effect transistor, and
wherein the method further comprises connecting and disconnecting a substrate terminal of the second current control element to and from, respectively, a source terminal of the second current control element and/or a drain terminal of the second current control element, depending on a ratio of a voltage applied to the main battery terminal and the voltage applied to the first charger terminal.

19. The method according to claim 13, wherein the first threshold value corresponds to a minimum battery detection voltage and the second threshold value correspond to a minimum charger detection voltage.

20. A charger control circuit for a portable electronic device, the charger control circuit comprising:
a first charger terminal,
a first comparator having a first input connected to the first charger terminal and a second input to which a first threshold value is applied, and
a second comparator having a first input connected to the first charger terminal and a second input to which a second threshold value is applied,
wherein the charger control circuit is configured to assign a voltage applied at the first charger terminal to one of at least three voltage ranges by using a first comparator signal of the first comparator and a second comparator signal of the second comparator,
wherein a first voltage range of the at least three voltage ranges corresponds to voltage values below the first threshold value, a second voltage range of the at least three voltage ranges corresponds to voltage values above the first threshold value and below the second threshold value, and a third voltage range of the at least three voltage ranges corresponds to voltage values above the second threshold value, wherein the second threshold value is greater than the first threshold value, and wherein the first threshold value corresponds to a minimum battery detection voltage and the second threshold value corresponds to a minimum charger detection voltage.

\* \* \* \* \*